United States Patent [19]
Hidalgo

[11] Patent Number: 5,868,495
[45] Date of Patent: Feb. 9, 1999

[54] METHOD FOR TREATING FLUENT MATERIALS

[76] Inventor: Oscar Mario Guagnelli Hidalgo, Guillermo Prieto No. 14 Circuito Novelistas Ciucad Satelite, 53100 Edo. de Mexico, Mexico

[21] Appl. No.: 84,677

[22] Filed: Jun. 29, 1993

Related U.S. Application Data

[63] Continuation-in-part of Ser. No. 906,153, Jun. 29, 1992.

[30] Foreign Application Priority Data

Jul. 8, 1991 [MX] Mexico ................................. 9100106

[51] Int. Cl.⁶ ....................................................... B01F 3/00
[52] U.S. Cl. .................. 366/171.1; 366/119; 366/172.1; 366/174.1; 366/306; 366/307; 366/316
[58] Field of Search .................................. 366/108, 113, 366/114, 124, 168, 171, 172, 174, 176, 241, 150, 264, 290–292, 302, 305, 307, 316, 340, 348, 349, 600, 119, 172.1, 174.1, 306, 171.1; 137/625.28, 625.31; 138/37, 40, 46

[56] References Cited

U.S. PATENT DOCUMENTS

| | | |
|---|---|---|
| Re. 33,524 | 1/1991 | Schram . |
| 271,130 | 1/1883 | Rowe et al. . |
| 956,065 | 4/1910 | Fleming . |
| 1,727,753 | 9/1929 | de Bethune . |
| 1,993,446 | 3/1935 | Huff . |
| 2,092,992 | 9/1937 | Thalman ............................ 366/307 X |
| 2,169,338 | 8/1939 | Ditto . |
| 2,469,999 | 5/1949 | Stober . |
| 2,734,728 | 2/1956 | Myers . |
| 2,745,372 | 5/1956 | Chertoff ............................. 366/172 X |
| 2,774,577 | 12/1956 | Anderson et al. . |
| 2,798,698 | 7/1957 | Dooley .................................. 366/171 |
| 2,960,318 | 11/1960 | Caillaud ............................. 366/305 X |

(List continued on next page.)

FOREIGN PATENT DOCUMENTS

| | | |
|---|---|---|
| 1287425 | 2/1962 | France . |
| 901011 | 1/1954 | Germany . |
| 1026107 | 3/1958 | Germany . |
| 574224 | 9/1977 | U.S.S.R. .............................. 366/124 |
| 971454 | 11/1982 | U.S.S.R. .............................. 366/307 |
| 993992 | 2/1983 | U.S.S.R. .............................. 366/307 |
| 1099990 | 6/1984 | U.S.S.R. .............................. 366/150 |
| 1560294 | 4/1990 | U.S.S.R. .............................. 366/108 |

OTHER PUBLICATIONS

"Supraton Homogenization, Dispersion and Reaction Machines", Krupp Industrietechnick GmbH, date unknown.

*Primary Examiner*—Charles E. Cooley
*Attorney, Agent, or Firm*—Dykema Gossett PLLC

[57] ABSTRACT

A method for treating a continuous flow of fluent materials employs an apparatus (20, 200) comprising a generally cylindrical housing (23, 202) having an inlet (22, 204), an outlet (24, 206) and a plurality of treatment stages for successively imparting pulses of energy to the fluent materials in order to disassociate the materials at the molecular level and achieve a homogeneous, highly dispersed mixture. Each of the treatment stages includes a pair of baffle plates (50, 52, 248, 250) which are relatively rotatable and oppose the flow of fluent materials through the housing, to define alternating zones of high pressure and cavitation. Each pair of the baffle plates include matched sets of openings (54, 56, 252, 254) therein which are periodically brought into alignment with each other as one plate rotates relative to the other, thereby allowing bursts of the fluent material to flow therethrough, from an upstream area (32, 212) of relatively high pressure into a cavitation area (84, 258). One of the baffle plates (52, 60, 248, 264) in each pair thereof is mounted on a shaft (77, 224) rotated by a motor (76) located external of the housing. Slidably adjustable ring gates (236, 288) respectively control the flow rate and direction of fluent material entering and exiting the treatment stages. An optional fluid pump (280) within the housing compensates for fluid pressure drops across the treatment stages.

20 Claims, 8 Drawing Sheets

U.S. PATENT DOCUMENTS

| | | |
|---|---|---|
| 3,188,183 | 6/1965 | Logan . |
| 3,222,038 | 12/1965 | Ashcraft . |
| 3,284,055 | 11/1966 | Johansen . |
| 3,513,864 | 5/1970 | Self . |
| 3,525,504 | 8/1970 | Colwell . |
| 3,544,074 | 12/1970 | Karpacheva et al. . |
| 3,591,344 | 7/1971 | Schnock et al. . |
| 3,660,279 | 5/1972 | Hoff . |
| 3,682,447 | 8/1972 | Zucker et al. . |
| 3,799,457 | 3/1974 | Ward et al. . |
| 3,826,740 | 7/1974 | Jewett . |
| 3,852,191 | 12/1974 | Zucker et al. . |
| 3,995,838 | 12/1976 | Zucker . |
| 4,008,882 | 2/1977 | Jorgenson . |
| 4,054,507 | 10/1977 | Pouska . |
| 4,089,475 | 5/1978 | Zucker . |
| 4,190,373 | 2/1980 | Zucker et al. . |
| 4,200,614 | 4/1980 | Colburn et al. . |
| 4,248,692 | 2/1981 | Knebel et al. . |
| 4,276,701 | 7/1981 | Takacs et al. . |
| 4,382,900 | 5/1983 | Wem . |
| 4,414,330 | 11/1983 | Zucker et al. . |
| 4,428,757 | 1/1984 | Hall . |
| 4,444,337 | 4/1984 | Kude et al. . |
| 4,447,251 | 5/1984 | Dunn et al. . |
| 4,447,535 | 5/1984 | Zucker et al. . |
| 4,452,612 | 6/1984 | Mattia . |
| 4,499,445 | 2/1985 | Mitchell . |
| 4,782,847 | 11/1988 | Leutzelschwab . |
| 4,854,721 | 8/1989 | Hume . |
| 4,865,751 | 9/1989 | Smission . |
| 4,869,849 | 9/1989 | Hirose et al. . |
| 4,874,248 | 10/1989 | Luetzelschwab . |
| 4,877,516 | 10/1989 | Schram . |
| 4,878,758 | 11/1989 | Schafer et al. . |
| 4,883,532 | 11/1989 | Bodine . |
| 4,885,098 | 12/1989 | Bodine . |
| 4,891,140 | 1/1990 | Burke, Jr. . |
| 4,906,387 | 3/1990 | Pisani . |
| 4,915,509 | 4/1990 | Sauer et al. ........................ 366/172 X |
| 4,945,937 | 8/1990 | Scribner . |
| 4,957,606 | 9/1990 | Juvan . |
| 4,961,860 | 10/1990 | Masri . |
| 4,974,292 | 12/1990 | Currier et al. . |
| 4,978,365 | 12/1990 | Gregoli et al. . |
| 4,983,189 | 1/1991 | Peterson et al. . |
| 4,990,260 | 2/1991 | Pisani . |
| 4,990,266 | 2/1991 | Vorlop et al. . |
| 5,000,859 | 3/1991 | Suciu et al. . |
| 5,006,283 | 4/1991 | Scutte et al. . |

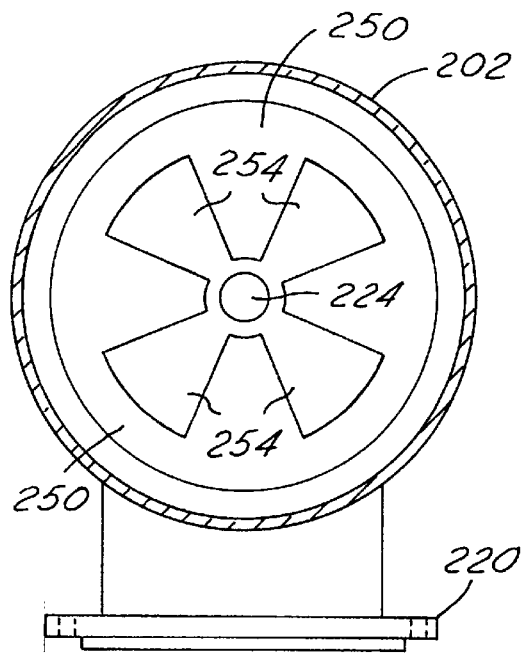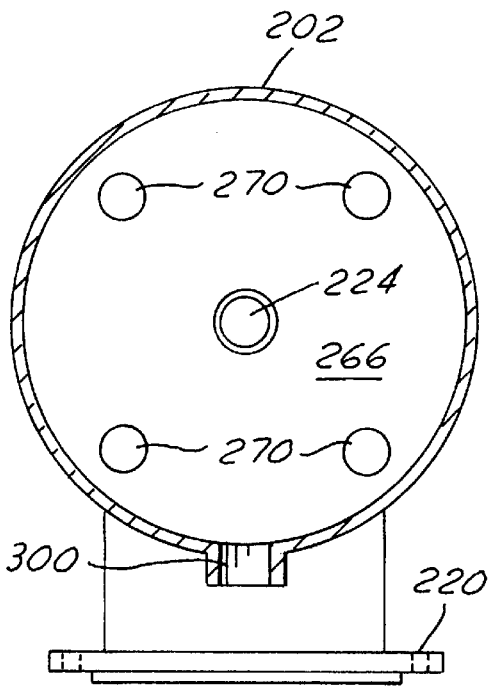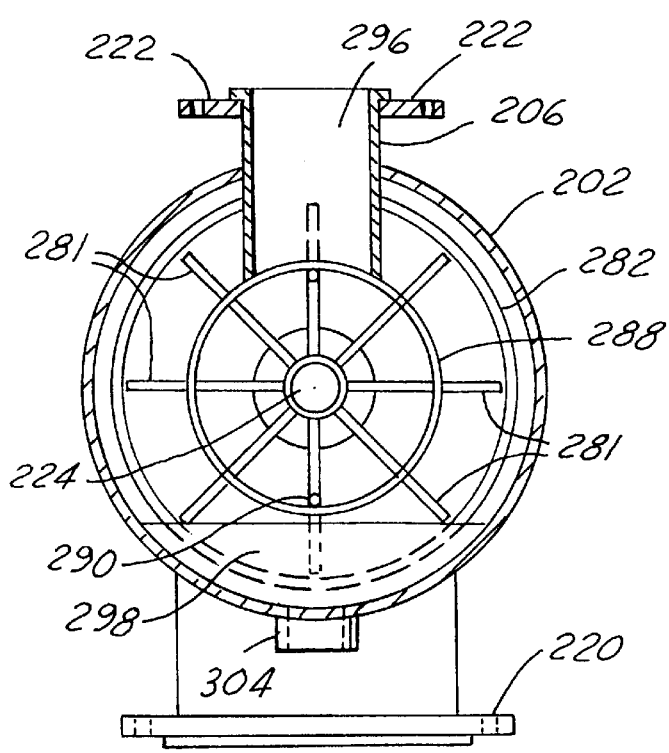

METHOD FOR TREATING FLUENT MATERIALS

RELATED APPLICATION

This is a continuation-in-part application of copending application U.S. Ser. No. 07/906,153 filed Jun. 29, 1993.

BACKGROUND OF THE INVENTION

1. Technical Field

The present invention broadly relates to methods and devices for treating fluent materials for purposes of mixing, reacting, conditioning and the like, and deals more particularly with a method and apparatus of this general type which imparts pulses of energy to the fluent materials by subjecting the flow of fluent materials to rapid, periodic changes in pressure.

2. Description of Prior Art

The fluid treatment art is replete with improved mechanical, pneumatic, hydraulic and electrical systems for mixing, agitating, reacting and conditioning fluent materials. In some of these systems, such as those dedicated to mixing operations, operating efficiency and effectiveness are dependent upon the degree of mass transfer of the fluent materials being mixed. Mass transfer is a function of the probabilities that particles/molecules of the differing fluent materials being mixed are exposed to each other, and this exposure depends in part upon the surface area presented by the particles/molecules of the different materials. In order to increase the probabilities for complete dispersal of the materials, mixing time may be increased. This alternative is available in the case of "batch" processing but may not be feasible in continuous type mixing processes where the resident time of the fluent materials in a mixing vessel is necessarily limited. Moreover, extending the duration of mixing or applying excessive amounts of energy in the mixing process may result in fracturization or excess micropulverization, producing undesirable fine dust or even degradation of the component parts of the materials being processed.

Various improvements have been devised to facilitate more efficient mixing and increase dispersion rates. For example, a device typifying one solution to this problem is disclosed in U.S. Pat. No. 4,874,248 issued Oct. 17, 1989 to Luetzelschwab. The Luetzelschwab device comprises a plurality of alternately arranged, stationary and rotating disks within a cylindrical housing which is intended to be employed for continuously mixing a gel and a liquid. The disks contain apertures through which the gel and liquid flow in order to break down the gel into smaller particles and increase the gel surface exposed to the liquid. A similar mixing device is shown in French Patent No. 1,287,425 which employs alternating fixed and rotating perforated plates to shear, chop and divide solid particles suspended in a liquid, or to mix different liquids. Further examples of mixers of this general variety are shown in German Patent Nos. 901,011 and 1,026,107. Prior art mixers of the type described immediately above, while adequate for certain applications, provide less than satisfactory efficiency in other applications. In some cases, the requisite degree of mixing may be achieved only with long resident times in the mixer, thus dictating, in the case of continuous type processes, a mixer of large physical dimensions in order to provide a long flow path within the mixer. Physically large mixers normally add to expense and typically consume larger amounts of energy to operate. In fact, in some of rotating/stationary disk type mixers, the disks are actually configured to create turbulence and increase the flow path (and thus residence time) so that they act more like batch processors.

Numerous types of processes are known for treating fluent materials to alter/improve their physical characteristics which involve the direct application of pulses or waves of energy to the materials. For example, U.S. Pat. No. 4,957,606 issued Sept. 18, 1990 to Juvan discloses a process for separating substances from liquids using high energy discharge initiated shock waves. U.S. Pat. No. 4,961,860 issued Oct. 9, 1990 to Masri discloses a water treatment process in which the water is subjected to ultrasonic vibrations producing cavitation of water through a fluid flow passage. The use of acoustical energy in standing waves for manipulating and separating fluent particles is also disclosed in U.S. Pat. Nos. RE33,524; 4,877,516 and 4,983,189.

SUMMARY OF THE INVENTION

According to one aspect of the invention, a method for treating fluent materials comprises introducing a pressurized flow of the fluent materials into a housing, and imparting pulses of energy to the fluent material by successively passing incremental quantities of the fluent materials in bursts from a relatively highly pressurized fluid zone through a pressure reducing baffle arrangement into a cavitation area downstream from the baffle arrangement. The baffle arrangement comprises a pair of baffle plates having orifices therein which periodically register with each other when one plate is rotated relative to the other. Rotation of one of the plates relative to the other allows discrete quantities of fluent materials to flow through the orifices into the cavitation area, thus rapidly changing the flow rate and fluid pressure at a preselected frequency. The step of passing the fluent materials through orifices in baffle plates into a cavitation area is repeated at a second treatment stage downstream from the first cavitation area to impart additional pulses of energy to the fluent materials. Vibratory energy may be applied to the fluent materials prior to the pulsation steps in order to preexcite and agitate the fluent materials.

According to another aspect of the invention, apparatus is provided for treating fluent materials comprising housing means including an inlet for receiving the fluent material and an outlet, and pulsing means within the housing for imparting pulses of energy to the fluent materials, including orifice means for passing incremental quantities of the fluent materials in bursts from a relatively high fluid pressure zone into a cavitation area. The pulsing means includes a pair of closely spaced baffle plates each including a plurality of openings defining the orifice means. One plate is stationary while the other is rotated so as to periodically shift the openings in the two plates into registration with each other in order to allow bursts of the materials to flow into the cavitation area, thus imposing mechanical pulses of energy on the fluent materials to alter their physical characteristics, either at the particulate or molecular level. A fluid pump in the form of a motor driven impeller may optionally be employed within the housing to compensate for pressure drops and thus assure a proper rate of flow of the materials through the housing. A reed-like element disposed in the flow path near the inlet and tuned to vibrate under the influence of the flow of fluent materials therepast imparts vibrational energy to the fluent materials in order to agitate and/or assist in premixing the materials prior to passing through the rotating baffle plates.

It is an important object of the present invention to provide a method and apparatus for treating fluent materials which is highly effective in imparting a level of energy to the materials which is sufficient to alter their characteristics at the particle or molecular level and thereby render them more suitable for segregation, mixing, etc.

Another object of the invention is to provide a method and apparatus of the type generally mentioned above which is exceptionally compact in size, requires minimal energy to operate and significantly reduces resident time of the fluent materials therein for processing.

A still further object of the invention is to provide a method and apparatus of the type described which is highly reliable and simple in its component parts, thus simplifying and reducing the expense of repair and maintenance.

A further object of the invention is to provide a method and apparatus of the type mentioned which provide continuous mixing of materials while achieving intimate interaction between component parts of the materials being mixed to enhance homogeneity and consistency of the mixture, with minimum residence time in the mixing apparatus.

These, and further objects and advantages of the present invention will be made clear or will become apparent during the course of the following description of the preferred embodiments of the present invention.

BRIEF DESCRIPTION OF THE DRAWINGS

In the drawings, which form an integral part of the specification and are to be read in conjunction therewith, and in which like-reference numerals are employed to designate identical components in the various views:

FIGS. 11, 12, 13 and 14 are sectional views respectively taken along the lines 11—11, 12—12, 13—13 and 14—14 in FIG. 6, but with certain parts not shown for purposes of clarity;

DESCRIPTION OF THE PREFERRED EMBODIMENTS

Figure 1:
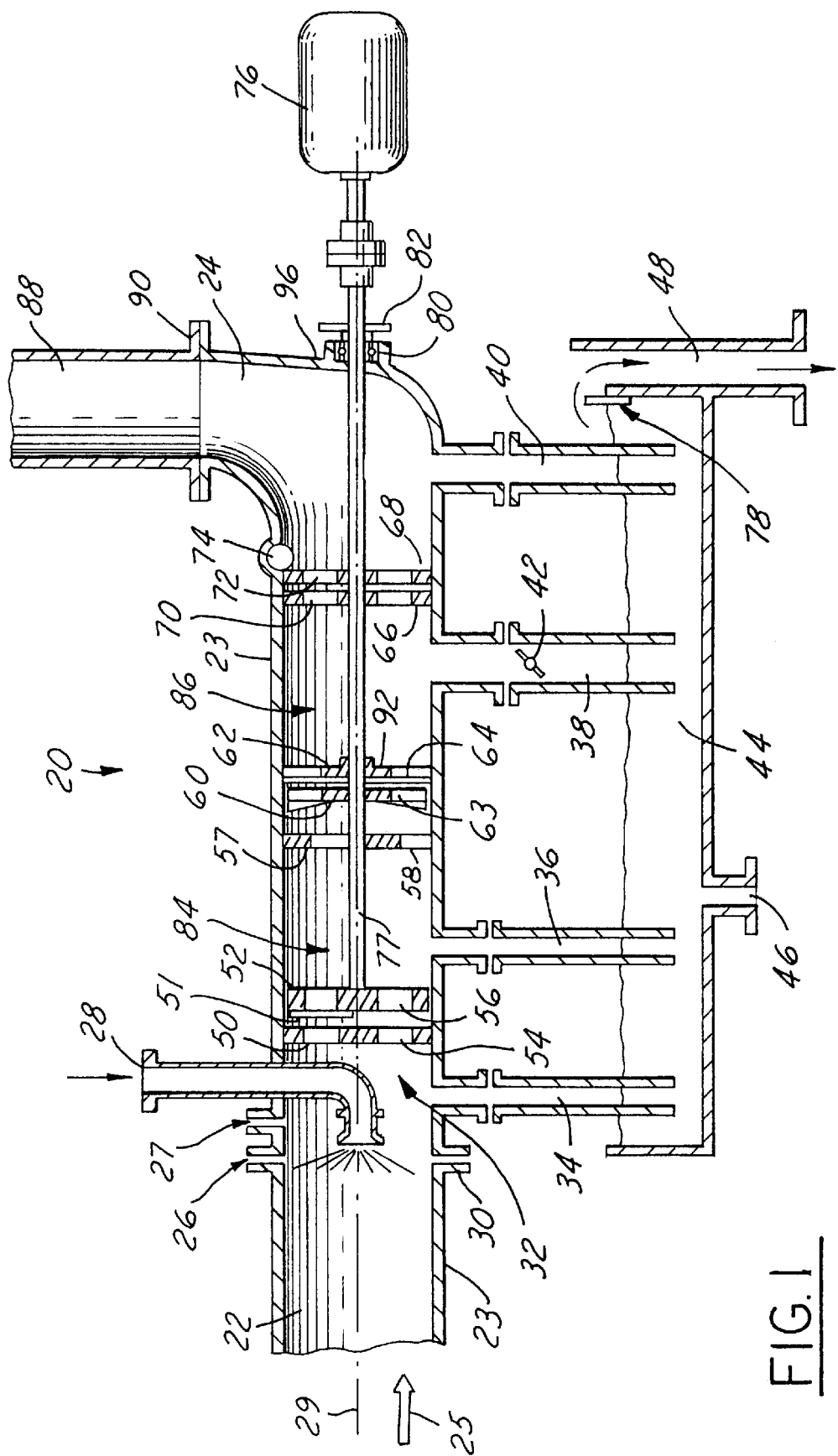
FIG. 1 is a combined diagrammatic and longitudinal sectional view of one embodiment of an apparatus for carrying out the method of fluent material treatment according to the present invention.

Attention is first directed to FIG. 1 which depicts an apparatus, generally indicated by the numeral 20, for treating fluent materials. As used herein, "fluent materials" means any materials which are flowable or exhibit fluid properties, including liquids, gases, particulates, and the like, or any combination thereof, in any physical state. The apparatus 20 illustrated in FIG. 1 is an embodiment of the invention particularly well-suited for performing mixing of two or more fluent materials, however, it is to be understood that the method and apparatus of the present invention may also be employed for treating a single fluent material to condition the material for subsequent use or processing or to remove/separate certain constituent parts of the material.

The apparatus 20 includes a generally cylindrical housing 23 having a main inlet 22 at one end thereof for receiving fluent materials by differential pressure, the incoming flow of which is designated by the arrow 25. The opposite end of the housing 23 includes an end wall 96, and a main outlet 24 which extends transversely outward relative to the longitudinal axis 29 of the housing 23. The main outlet 24 may be coupled by a flange 90 to a pipe 88 delivering treated fluent materials to a subsequent process, disposal area or use. In addition to the main inlet 22, additional secondary inlets may be provided for introducing additional fluent materials into the housing 23, four of such secondary inlets being respectively indicated at 26, 27, 28 and 30. Secondary inlets 26, 27 and 30 are defined in the sidewalls of the housing 23, while inlet 28 is formed by a tube extending through the sidewall of housing 23, which includes an outlet disposed at the central axis 29 of the housing 23 and oriented to introduce the fluent material in an upstream direction, in opposition to the main flow 25, thus tending to evenly disperse the secondary fluent material into the main stream of flow.

The secondary fluent materials are combined with the main flow at a premixing area 32 immediately before entering a first treatment stage defined by baffle means in the form of a pair of parallel, circular flat, planar baffle plates 50, 52 and a cavitation zone 84 immediately downstream of plates 50, 52. In combination, the baffle plates 50, 52 close-off essentially the entire cross-section of the interior of the housing 23 and thus oppose the flow of fluent materials through the housing 23 so as to maintain a relatively high fluid pressure on the upstream side of the plates 50, 52. The baffle plates 50, 52 are preferably spaced as closely to each other as possible in the direction of the axis 29 and may include blade elements (not shown) on the opposed spacing surfaces thereof to cut in a scissors-like action, any particles that may become lodged between the plates 50, 52. Baffle plate 50, disposed upstream of plate 52, is stationarily secured and sealed around its periphery to the interior sidewall of the housing 23. Plate 50 is coextensive with the cross-section of the housing 23 and includes a plurality of later discussed orifice openings 54 therethrough, evenly spaced and distributed around the central axis thereof. Baffle plate 52 is secured at its central axis to one end of the rotatable shaft 77 for rotation therewith. The diameter of the rotatable baffle plate 52 is just slightly less than that of the inside diameter of the housing 23 to provide adequate clearance therebetween. A plurality of circumferentially spaced openings 56 are provided in the rotatable baffle plate 52, the configuration of which will be discussed later in more detail. The sets of openings 54, 56 respectively in plates 50, 52 are configured and positioned so as to periodically shift into aligned registration with each other as the shaft 77 and plate 52 are rotated at a preselected frequency by a motor 76.

The shaft 77 extends through end wall 96 of the housing 23 and has one end thereof journalled for rotation in a bearing 80 provided with a seal 82 to prevent the escape of fluent materials therethrough. The motor 76 may be of a conventional electrical, pneumatic or hydraulic type.

A second fluent material treatment stage, downstream of and similar to the earlier discussed stage, comprises a second pair of circular baffle plates 60, 62, and a second cavitation zone or area 86 downstream therefrom. Plate 60 is secured to the shaft 77 for rotation therewith, while plate 62 is stationarily secured to the interior wall of the housing 23. The rotatable plate 60 is essentially coextensive with the cross-section of the housing 23, with only enough clearance around its periphery to permit free rotation thereof. Plates 60 and 62 respectively include first and second sets of circumferentially spaced openings, 63, 64 therethrough which are arranged so as to periodically shift into aligned registration with each other as the shaft 77 rotates, thereby allowing incremental quantities of the fluent material to flow in bursts therethrough from the relatively high pressure area immediately preceding plates 60, 62 into the cavitation area 86. The fixed baffle plate 62 includes a bearing 92 therein for rotatively supporting the shaft 77 intermediate its opposite ends. The plates 60, 62 are otherwise similar in construction, function and arrangement to those of the previously described treatment stage.

A pressure balancing baffle plate 57 is stationarily secured within the housing 23 immediately upstream of the second treatment stage. The baffle plate 57 is ring-shaped, having a central opening 58 therein, and presents a surface area opposing flow of the fluent materials which is sized to prevent an inordinate drop in fluid pressure (due to low pressure in the cavitation area 84) before the flow enters the second treatment stage. In a similar manner, the fluid pressure downstream of the second cavitation area 86 may be controlled, as required, by a flow control valve defined by a stationary plate 66 and a movable plate 68 respectively provided with openings 70, 72 therethrough. A conventional valve control 74 such as an endless screw, gear, rack or the like is employed to rotate plate 68 relative to plate 66 thereby adjusting the extent of registration of openings 70, 72, and thus controlling the flow therethrough as well as the fluid pressure within the second cavitation area 86.

Any of the fluent materials or components thereof may be removed at any desired location during flow through the housing 23 by means of a series of purge lines 34, 36, 38, 40. In the embodiment illustrated in FIG. 1 purge line 34 diverts fluent material from the premix area 32, purge line 36 diverts material from the first cavitation area 84, purge line 38 diverts material from the second cavitation area 86 and purge line 40 diverts material immediately before it leaves the apparatus 20 through the main outlet 24. The purge lines 34–40 may be valve controlled, if desired, a butterfly valve 42 being shown for illustrative purposes in purge line 38. Purge lines 34–40 may deliver materials diverted thereby into a common tank or decanter 44 provided with a purge line 46 in the bottom thereof. An overflow line 48 may be employed to draw-off excess quantities of materials accumulated in the tank 44, and a conventional level control 78, such as a slide gate cooperates with the overflow line 48 to maintain a desired level of material in the tank 44.

Figure 2:
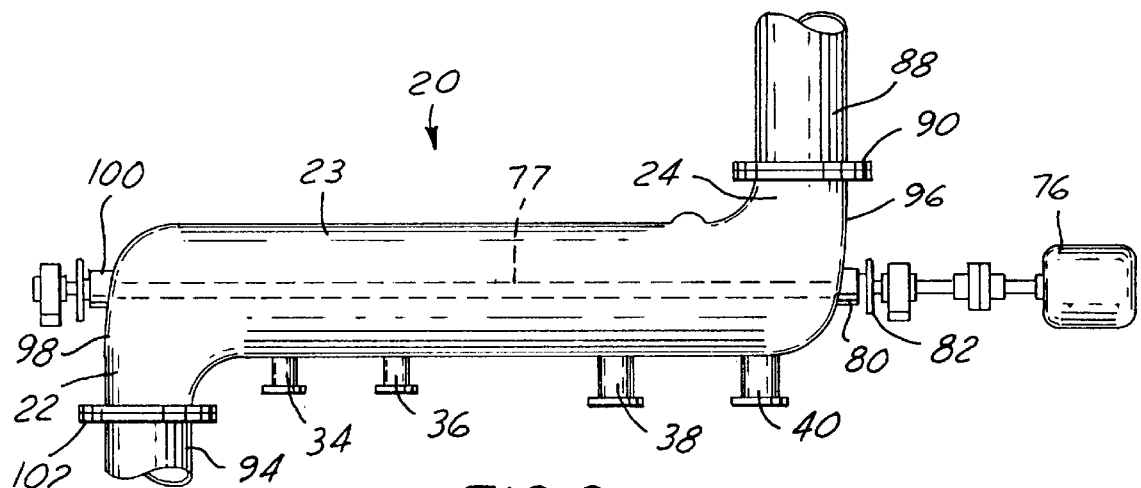
FIGS. 2 and 3 are side views of two alternate forms of the apparatus shown in FIG. 1.
Figure 3:
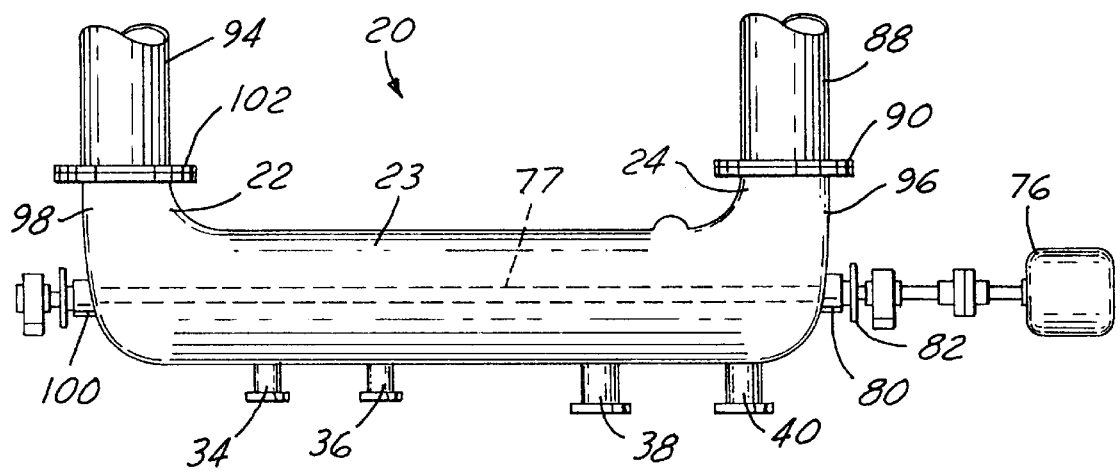
Figure 4A:
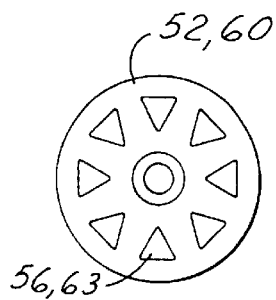
FIGS. 4A–4G are, respectively, front elevational views of alternate embodiments of rotatable baffle plates which may be employed in the apparatus of FIG. 1.
Figure 4B:
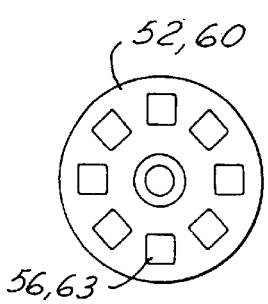
Figure 4C:
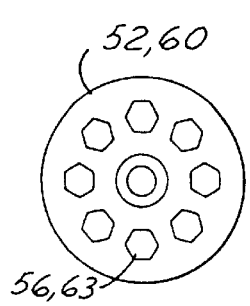
Figure 4D:
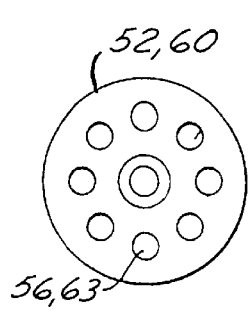
Figure 4E:
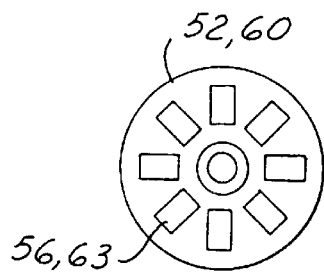
Figure 4F:
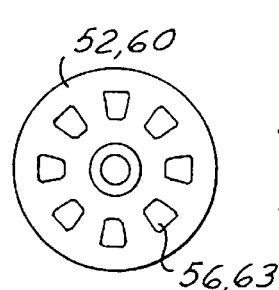
Figure 4G:
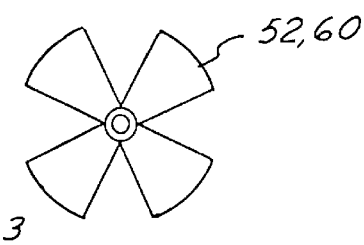
Figure 5A:
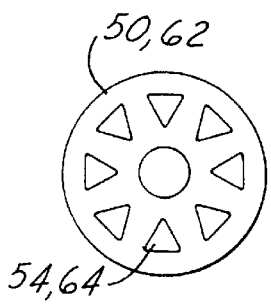
FIGS. 5A–5G are, respectively, front elevational views of alternate embodiments of stationary baffle plates which may be respectively paired with the baffle plates of FIGS. 4A–4G and employed in the apparatus of FIG. 1.
Figure 5B:
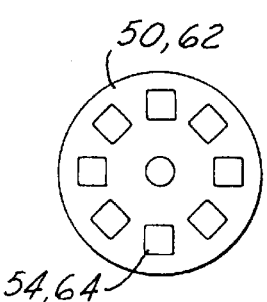
Figure 5C:
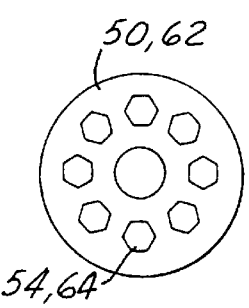
Figure 5D:
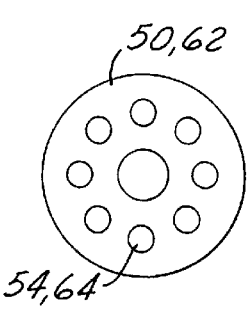
Figure 5E:
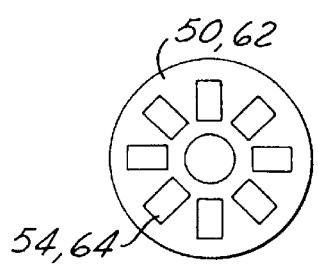
Figure 5F:
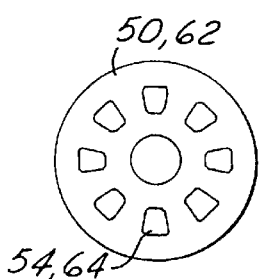
Figure 5G:
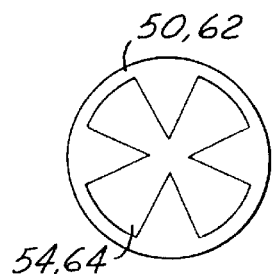

FIG. 2 depicts a slightly modified form of the apparatus 20, wherein the housing 23 is provided with a second end wall 98 opposite end wall 96, and the main inlet 22 extends essentially perpendicular to the axis of the housing 23, downwardly as depicted in FIG. 2, opposite the direction of the outlet 24. The main inlet 22 shown in FIG. 2 is connected by a flange 102 to a supply pipe 94. A further modified form of the apparatus 20 is shown in FIG. 3 wherein the main inlet 22 is likewise oriented essentially perpendicular to the longitudinal axis of the housing 23 but extends upwardly in a direction parallel to that of the outlet 24. In the case of both FIGS. 2 and 3, the provision of the second end wall 98 allows the shaft 77 to be supported at its outer end by means of a bearing 100 mounted on the end wall 98.

Attention is also now directed to FIGS. 4A–G and 5A–G which illustrate a few of the possible configurations of the openings provided in the baffle plates 50, 52, 60, 62. Specifically, FIGS. 4A–G depict suitable opening configurations for rotatable baffle plates, i.e., baffle plates 52 and 60, while FIGS. 5A–G depict suitable configurations for fixed baffle plates, i.e., baffle plates 50, 62. The plates shown in FIGS. 4A–G and 5A–G respectively form matched pairs of rotatable and fixed baffle plates, e.g., the plates shown in FIGS. 4A and 5A form a matched pair of a rotatable and fixed plate, respectively which could be employed in either the first or second treatment stages, as plates 50, 52 or 60, 62. As can be seen from FIGS. 4A–G and 5A–G, the openings 54, 56, 63, 64 are discrete geometric shapes uniformly distributed in circumferentially spaced relationship about the central axis of each plate. The shape of the openings 54, 56, 63, 64 may take the form of triangles (FIGS. 4A–5A), squares (FIGS. 4B–5B), hexagons (FIGS. 4C–5C), circles (FIGS. 4D–5D), rectangles (FIGS. 4E–5E), truncated segments (FIGS. 4F–5F) or fan-shaped segments (FIGS. 4G–5G). Numerous other shapes of openings 54, 56, 63, 64 may also be employed, and the particular configuration selected is dependent in part on the specific application of the apparatus 20. In any event, it may be seen from FIGS. 4A–G and 5A–G that rotation of one plate relative to the other results in periodic juxtaposition of the openings in the pairs of baffle plates, from a flow blocking relationship to an aligned, registered relationship permitting the flow of fluent materials therethrough in an oscillatory manner which in turn imparts sinusoidal-like pulses of energy to the fluent materials. An additional amount of energy is imparted to the materials as a result of the mechanical shock imposed thereon as the baffle plates 50, 52, 60, 62 mechanically collide with the materials during the scissors-like chopping of the fluid flow through the baffle plate openings. The profile and frequency of these pulses is determined by the size, distribution and geometry of the baffle plate openings as well as the rotational speed thereof.

Turning now to the operation of the apparatus 20, fluent materials comprising gases, liquids, dust/particulates or any combination thereof are delivered either through the main inlet 22 or any of the secondary inlets 26–30 and become preliminary mixed in the premixing area 32, immediately upstream of the first treatment stage. The flow of fluent materials through either the main inlet 22 or secondary inlets 26–30 is delivered to the inlet 22 under pressure produced either from an upstream pressure source such as a pump (not shown) or other means of providing a sufficient head to overcome any pressure drops experienced during the course of flow through the housing 23. Alternatively, the necessary fluid flow pressure may be generated by means of a pump or the like either downstream of the outlet 24 or integrated internally within the housing 23. By way of example and not limitation, a typical application of the embodiment of the apparatus 20 shown in FIG. 1 may require a flow pressure of between 8 mm of water column up to 40 Kg/cm, independent of consistency, temperature or viscosity of the fluent materials.

As the shaft 77 is rotated by the motor 76, the identically configured openings 54, 56 respectively in baffle plates 50, 52 are periodically rotated between a non-aligned, flow-blocking relationship, and an aligned coextensive relationship permitting the flow of an incremental quantity of fluent material therethrough, from the premixing area 32 into the cavitation area 84. The cavitation of the fluid flow in cavitation area 84 of course results from the baffling effect of plates 50, 52 and the periodic nature of flow through baffle plates 50, 52. The incremental quantities of fluent material thus flow through the aligned openings 54, 56 in bursts from an area of relatively high pressure (premix area 32) to an area of relatively low pressure (cavitation area 84). This rapid, periodic change in the flow rate and pressure of the fluent materials at a preselected frequency results in pulses of energy being imparted to the fluent materials. As will be discussed later in more detail, these pulses of energy imparted to the fluent materials tend to breakdown, destabilize and/or disorder particulates, aggregations of molecules or chains of molecules into a very homogeneous dispersion. Where multiple fluent materials are introduced into the apparatus 20 for mixing, the pulses of energy applied to the mixture in the manner described above results in disordering of the molecules of the fluent materials that otherwise tend to be attracted toward each other by weak bonds such as van der Waals forces, thus increasing the exposed surface areas of the molecules to thereby increase mass transfer and obtain a more complete, homogeneous mixture.

The rate at which pulses of energy are applied to the fluent materials by both the first and second treatment stages is dependent upon the number, size geometry (profile) and spacing of the openings 54, 56, 63, 64 in the baffle plates 50, 52, 60, 62 as well as the rotational speed of the shaft 77. These parameters are chosen to suit the particular application of the apparatus 20, taking into consideration the characteristics of the fluent materials to be treated. By way of illustration, however, the frequency of pulsation may be from 5 Hz to 100 KHz for a range of typical applications.

In some applications, passing the fluent materials through a single treatment stage may be adequate to achieve the desired results, while other applications may require two or more stages to obtain satisfactory results. In the event of a multiple treatment stage arrangement, such as is shown in the embodiment of FIG. 1, it may be necessary to compensate for the pressure drops in the fluid flow occasioned by the effects of cavitation, as in the first cavitation area 84, before the flow is delivered to a subsequent treatment stage. Thus, in the embodiment of FIG. 1, the pressure regulating baffle plate 57 provided with a flow-through opening 58 compensates for the pressure drop in cavitation area 84 by building up the pressure of the fluid immediately before it passes through the second treatment stage defined by baffle plates 60, 62 and the second cavitation area 86. Therefore, fluent materials at a relatively high pressure level pass through the openings 63, 64 in baffle plates 60, 62 in periodic bursts of fluid flow, into an area of relatively low fluid pressure defined by the cavitation area 86. In this respect, the second treatment stage functions much like the first treatment stage described earlier, to impart pulses of energy to the fluent material, thereby further destabilizing and disordering them on a molecular level to effect mixing thereof and/or condition the fluent materials for subsequent use or processing after exiting the housing 23. It may be noted here that the rotatable baffle 62 is disposed on the upstream side of the stationary baffle 62, unlike the first treatment stage wherein the stationary baffle 50 is on the upstream side of the rotating baffle plate 52; the order of the fixed and rotating baffle plates in each pair thereof is not significant.

The flow control valve formed by the plates 66, 68 may be adjusted to alter the flow pressure at the outlet 24 and may be employed to adjust the upstream pressure and optimize the effects of the first and second treatment stages on the fluent materials.

Purge lines 34–40 may be optionally employed to divert portions or byproducts of the fluent materials before, during and after they are processed by the first and second treatment stages.

The mass transfer efficiency of the apparatus and process of the present invention is extremely high. Essentially, the apparatus of the present invention acts as a physical reactor, in which the fluent materials are acted upon at the molecular level. As a result of the cyclical, alternating pressures imposed on the fluent materials, a conversion of energy results which causes the molecules of the fluent materials to become disassociated with each other. This temporary disassociation can be very advantageous in connection with processing certain kinds of fluent materials, such as effluent combustion gases containing contaminants such as $SO_2$. When such effluent gases are introduced into a liquid, such as water and processed through the apparatus of the present invention, the molecules of the water and the $SO_2$ are each disassociated so that the $SO_2$ molecules are attracted to the $H_2O$ molecules, thus permitting removal of the $SO_2$ very easily in subsequent processing. The important feature to appreciate here is the fact that when the apparatus of the present invention applies sufficient energy to the fluent mixture to overcome the van der Waals forces tending toi hold the molecules together, thereby resulting in disassociation of the $S0_2$ molecules which greatly increases the amount of exposed surface area of these molecules, and they become naturally attached to the $H_2O$ molecules. This phenomena is particularly advantageous compared to prior, conventional devices which rely only upon the exposure of the surface area of the molecules in their associated, grouped state. In such a state, the amount of surface area is drastically reduced which could otherwise be available to react with other, different molecules in the mixture.

In the case of the example mentioned about involving removing $SO_2$ from effluent gases, after processing by the apparatus of the present invention, the $SO_2$ molecules are homogeneously mixed in the $H_2O$. This same phenomena is of great assistance in mixing and blending various materials so as to achieve a very uniform, homogeneous dispersion of one material into another. It is believed that the process of the present invention changes not only the enthalpy of the system, but the entropy of the system as well. More specifically, the mechanical energy derived from the motor turning the shaft of the apparatus results in rapid pressure changes as the fluent material passes through the aperture and the baffle plates, thereby creating cyclical changes in energy; in effect, this results in a conversion of a portion of the enthalpy of the system to entropy, as the various baffle plates switch from close to open positions. The frequency and amplitude of this pressure change determines the amount or quantum of thermal energy that is periodically applied to the fluent materials.

Figure 6:
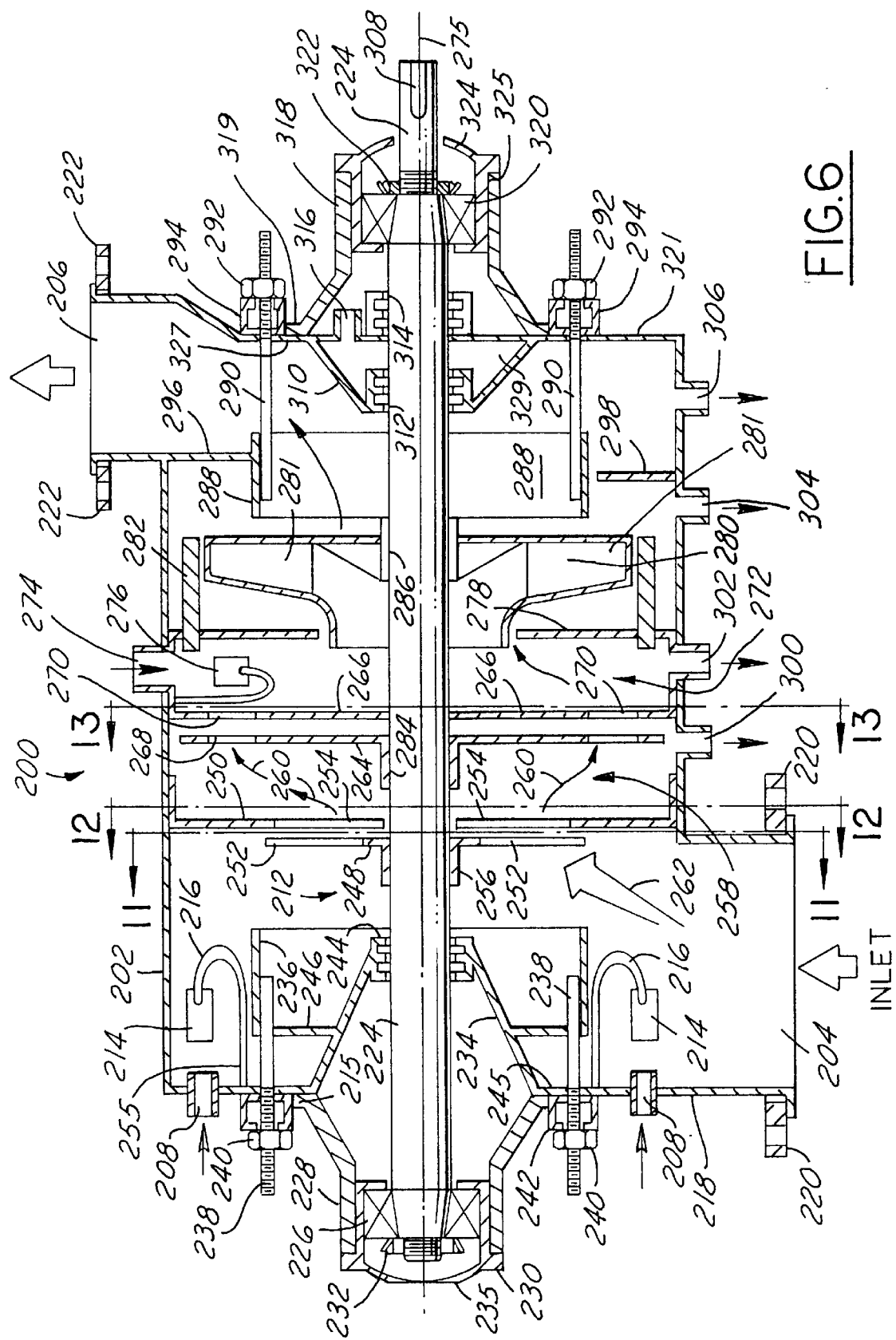
FIG. 6 is a longitudinal cross-sectional view of apparatus carrying out a method for treating liquids in accordance with the preferred embodiment of the present invention.
Figure 7A:
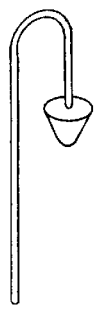
FIGS. 7A–7H are perspective views, respectively of alternate forms of the vibrating elements employed by the apparatus of FIG. 6.
Figure 7B:
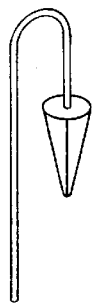
Figure 7C:
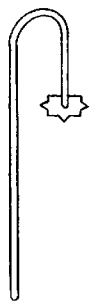
Figure 7D:
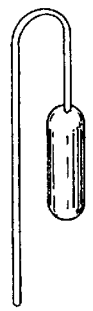
Figure 7E:
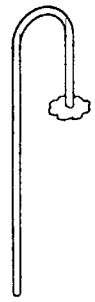
Figure 7F:
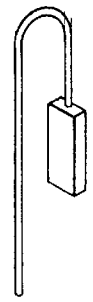
Figure 7G:
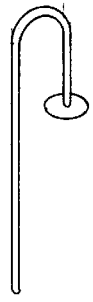
Figure 7H:
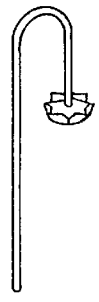
Figure 8:
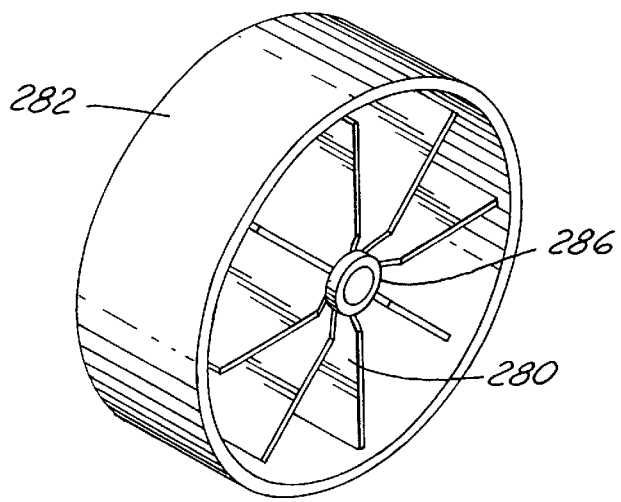
FIG. 8 is perspective view of the fluid pump employed in the apparatus of FIG. 6.
Figure 9:
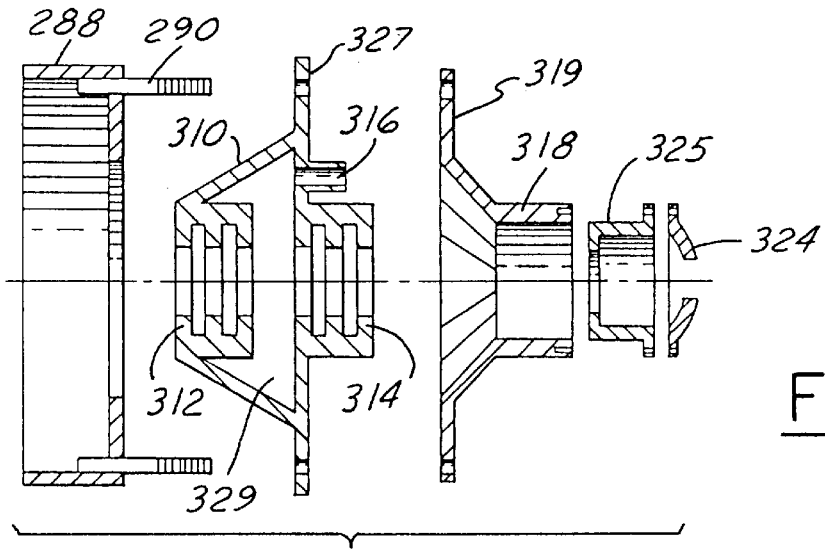
FIGS. 9 and 10 are exploded, cross-sectional views showing the details of the bearings flow control elements employed respectively at opposite ends of the apparatus of FIG. 6.
Figure 10:
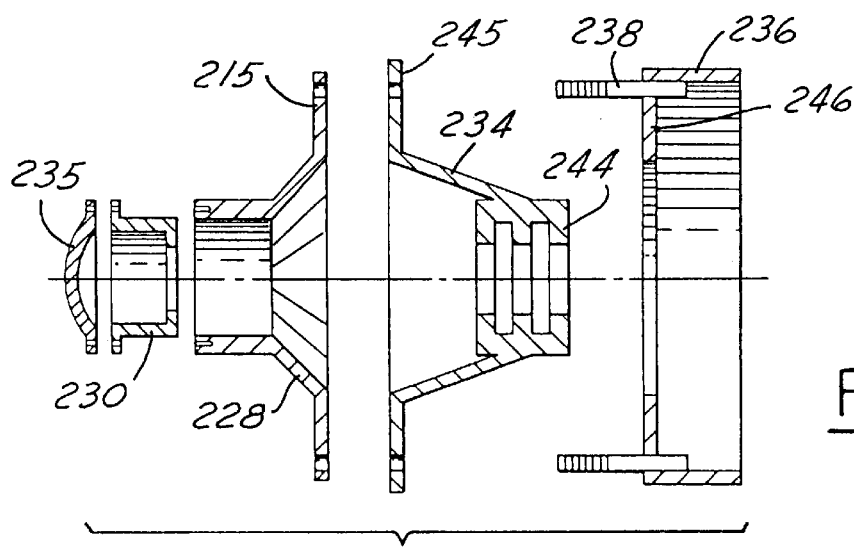
Figure 11:
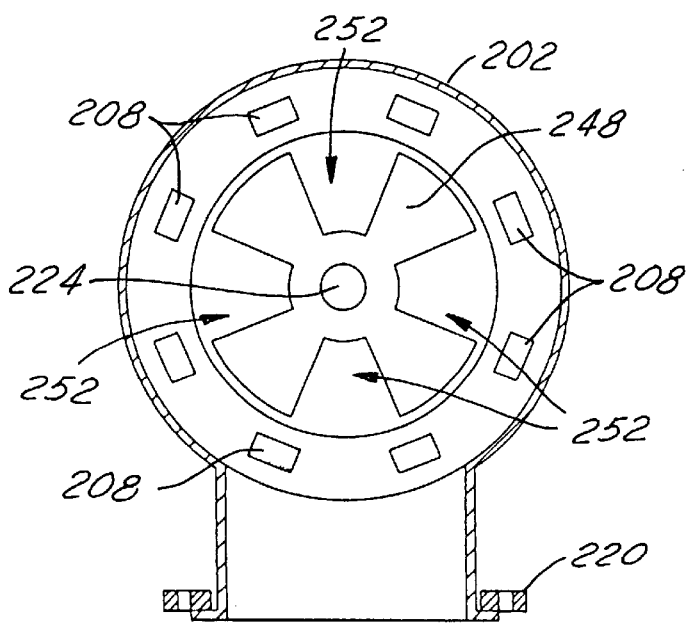

Reference is now made to FIGS. 6, 8, 9 and 10 which depict a preferred form of the apparatus of the present invention, generally indicated by the numeral 200 in FIG. 6. The apparatus 200 broadly includes a generally cylindrical housing 202, a radially directed primary inlet 204 at one end of the housing 202, and a radially directed outlet 206 at the opposite end of the housing 202. The inlet 204 and outlet 206 are respectively provided with mounting flanges 220, 222 for connection with conduits (not shown) or the like or other components in the system in which the apparatus 200 is integrated. Inlet 204 is adapted to receive fluent materials from a source (not shown) in the direction of the arrow 262 toward a premixing area generally indicated by the numeral 212 which immediately precedes a first treatment stage to be discussed below. Additional fluent materials, identical to or different from the materials introduced through the primary inlet 204, may be introduced through a plurality of circumferentially spaced secondary inlets 208 defined in one end wall 218 of the housing 202. Inlets 208 may comprise, for example, spray nozzles for introducing liquids to be mixed with fluent materials introduced through the primary inlet 204. A reed-like vibrating element 214 mounted on a stem 216, is disposed immediately downstream of and aligned with the incoming flow of fluent materials introduced through the secondary inlets 208. The vibrating elements 214, as shown in FIG. 6, are formed of thin, rectangularly-shaped material which, under the influence of fluent material flowing therepast, vibrate at a preselected resonant frequency. The sympathetic vibrations imparted by the vibrating elements 214 to the flow of fluent materials therepast tends to excite and agitate the material flow so as to better disperse and mix with the fluent material introduced though the primary inlet 204. The precise resonant frequency, size and configuration of the vibrating elements 214 will depend upon the particular application. However, by way of example, several typical alternate shapes for the vibrating elements 214 are depicted respectively in FIGS. 7A–H. FIGS. 7A–H respectively show vibrating elements 214 configured in the shape of: a cone, a pyramid, a star, an oval, a toothed disk, a rectangle with increased thickness, a circle, and finally a pie crust edge-like configuration.

A shaft 224 extends longitudinally through the central axis of the housing 202 and is journalled for rotation at its opposite ends by bearings 226, 320. The ends of the shaft 224 are threaded to receive lock nuts 232, 322 which restrain the shaft 224 against longitudinal movement. A keyway 308 in one end of the shaft 224 adapts the shaft 224 to be connected with a source (not shown) of rotational power, such as an electric, hydraulic or pneumatic motor. Bearing 226 is disposed within a bearing pack 230 provided with a removable cap 235. Similarly, bearing 320 is disposed within a bearing pack 325 provided with a removable cap 324 having a central opening thereof through which one end of the shaft 224 extends.

Bearing pack 230 is mounted within the outer end of a hub 228 which includes a peripheral portion 215 secured to the end wall 218; the hub 228 forms the main structural support for one end of the shaft 224. A generally conical, protective bearing shroud or boot 234 includes a flange 245 for mounting the boot 234 to the end wall 218. The boot 234 extends into the housing 202 and includes a plurality of ring seals 244 surrounding the shaft 224 to assist in sealing and isolating the bearings 226 from the environment within the housing 202.

A cylindrically-shaped ring gate 236 disposed in the premixing chamber 212 surrounds the shaft 224, concentric with the central axis 275 of the housing 202, and includes an annular bottom wall 246. The ring gate 236 is concentrically disposed within and is partially overlapped by a ring-shaped deflector 255 which extends inwardly from the end wall 218 toward the premixing area 212. The ring gate 236 is mounted for longitudinal sliding movement relative to the deflector ring 255 by means of slidable stud shafts 238 which extend longitudinally through openings in the end wall 218 and support bosses 242. The outer ends of the slidable shafts 238 are threaded to receive nuts 240 which lock the ring gate 236 in a desired longitudinal position relative to the deflector ring 255. Motor means (not shown) may be connected, if desired, to the outer ends of the shafts 238 to provide automatic longitudinal displacement of the ring gate 236 which functions to alter the amount and flow of fluent materials entering the mixing area 212.

The motor-driven end of the shaft 224 is structurally supported on the housing 202 by means of a support hub 318 which houses the bearing pack 325 in the outer end thereof. The hub 318 includes an outer flange 319 secured to end wall 321. In order to protect the bearing 320 from the environment within the housing 202, there is provided a bearing boot 310 disposed within the housing 202 and mounted on the end wall 321 by means of an peripheral flange 327. The protective bearing boot 310 includes a pair of longitudinally spaced seals 312, 314 each including a plurality of ring seals engaging the shaft 224 to prevent fluent materials and the like within the housing 202 from passing through the boot 310 into the bearing 320. Between the seals 312, 314, a chamber 329 is provided for receiving a pressurized fluid, such as water or air from a supply inlet 316. The pressurized fluid within chamber 329 tends to equalize and oppose the fluid pressure within the housing 202 that tends to urge the fluent materials to enter the seal 312 around the shaft 224.

A cylindrically-shaped slide ring gate 288 is secured to sliding stud shafts 290 which extend through openings in the end wall 321. Sliding studs 290 have their outer ends threaded to receive nuts 292 which bear against mounting bosses 294 in order to lock the ring gate 288 in a desired longitudinal position, surrounding the shaft 224, immediately upstream of the outlet 206. The ring gate 288 cooperates with a partition wall 296 and a deflecting wall 298 to adjust the amount and direction of flow toward the outlet 206. Motor means (not shown) may be coupled with sliding shafts 290 to provide automatic motorized control of the position of the ring gate 288.

A first fluent material treatment stage, immediately downstream of the premixing area 212, broadly comprises a rotatable baffle plate 248, stationary baffle plate 250 and a cavitation area 258. Rotatable baffle plate 248 includes a hub 256 secured to shaft 224 for rotation therewith, and a plurality of radially extending blades having openings 252 therebetween, similar in geometry to the arrangement depicted in FIG. 4G. The stationary baffle plate 250 is closely spaced longitudinally from and downstream of the rotatable baffle plate 248, and has its outer periphery secured to the interior wall of the housing 202. The stationary baffle plate 250 is provided with a plurality of openings 254 therein which are arranged similar to the configuration shown in FIG. 5G, previously discussed. The longitudinal spacing between plates 248 and 250 is as small as possible to minimize any flow of fluent material in a radial direction, therebetween. Similarly, the inner central edges of the stationary baffle plate 250 are radially positioned as closely around the shaft 224 as is feasible in order to prevent the flow of fluent materials through this gap, rather than through the openings 254. As previously discussed, the shape, size, geometry (profile) and number of the openings 252, 254, in combination with the rotational speed of the shaft 224 are selected based upon the particular application and use of the apparatus 200, so as to produce pulsation of the fluent materials at a desired frequency.

Bursts of fluid incrementally passing through the openings 252, 254 flow through the cavitation area 258 in the direction of the arrows 260 toward a second fluent material treatment stage broadly comprising a rotating baffle plate 264 mounted on shaft 224 by a hub 284, a stationary baffle plate 266 having its outer periphery secured to the interior wall of housing 202, and a second cavitation area 272. Baffle plates 264, 266, which are longitudinally spaced from each other as close as possible, respectively include a plurality of openings 268, 270 therein which may be of any of the configurations respectively shown in FIGS. 4A–G and 5A–G. As best seen in FIG. 6, the openings 268, 270 are radially-spaced somewhat outbound of the openings 252, 254 contained in the plates 248, 250 of the first treatment stage, thus forcing the fluid to alter its course radially outward somewhat as it flows from the first to the second treatment stage. Incremental quantities of the fluent materials passing through the openings 268, 270 in bursts enter the second cavitation area 272 and thence are drawn through a fan-type impeller pump 280. The pump 280 includes an outer deflection ring 282 surrounding an impeller 281 which is mounted by a hub 286 for rotation on the shaft 224, along with the rotating baffle plates 248, 264. The pump 280 is optionally employed, as necessary, to generate the required fluid flow through the housing 202 to compensate for pressure drops in the first and second treatment stages. Such pump may alternately be provided, however, as a separate component, located exterior of the housing 202, connected with either the inlet 204 or outlet 206.

A further fluid material inlet 274 in the housing 202 is positioned immediately downstream of the second treatment stage and allows additional fluid material to be introduced into the cavitation area 272. A further reed-like vibrating element 276 may be provided at the inlet 274 for agitating and preconditioning the fluent material entering the inlet 274 to aid in its mixing with other fluent materials passing through the second treatment stage.

A plurality of purge outlets 300, 302, 304 and 306 are provided at longitudinally-spaced locations in the wall of the housing 202 to permit diversion of portions of the fluent material at intermediate stages of treatment thereof, and to aid in cleaning out the apparatus 200.

The operation of the apparatus 200 shown in FIG. 6 is fundamentally similar to that of the apparatus 20 shown in FIG. 1. Fluent material entering inlet 204 is combined with optional additional fluent materials entering secondary inlets 208, in the premixing area 212 prior to passing through the first treatment stage. As the shaft 224 rotates, openings 252, 254 in baffle plates 248, 250 periodically come into circumferential alignment with each other to allow bursts of the fluent materials to pass therethrough and into the cavitation area 258 where the fluid pressure is substantially less than that in the premixing area 212. Incremental quantities of fluent materials which have entered the cavitation area 258 then immediately flow downstream to the area preceding the baffle plate 264 wherein the fluid pressure is again relatively high compared to that of the cavitation area 258. These incremental bursts of fluid flow, in which the fluent material is subjected to a sharp pressure drop and is subsequently repressurized, are thus cyclical in nature and result in imparting pulses of energy to the fluid at a desired frequency.

The fluent material then passes through the second treatment stage comprising baffle plates 264, 266 and cavitation area 272. Again, the fluent material passes through openings 268, 270 when the latter are circumferentially aligned so as to permit periodic bursts of the materials to flow into the second cavitation area 272 and thence quickly downstream to an area of substantially higher pressure, thus imparting a second series of energy pulses to the fluent materials at a frequency which is not necessarily the same as, and indeed is preferably different than the frequency of energy pulses imparted by the first treatment stage.

At both the first and second stages, the rotating plates 248, 264 strike the fluent materials thereby adding energy to the material and increasing the entropy of the system. The alternate opening and closing of the two stages creates an exploding, syringe-like effect, with the pressure of the fluent material oscillating between values greater and less than normal atmospheric pressure. This explosion-like effect is a result of the bubble-like incremental quantities of fluid passing from a relatively high pressure zone, through the baffle plates into a relatively low pressure zone.

The fluent material is then drawn by the impeller pump 280 past the slide ring gate 288 through the outlet 206. The impeller 281 striking the fluent material further adds additional energy to the material. The impeller pump 280 functions to compensate for the pressure drop in the housing 202 resulting from any of various factors, including the effects of first and second treatment stages.

Flow rates and fluid pressures through the apparatus are controlled in part by changes in the pressure of the fluent materials entering the inlet 204, longitudinal positioning of the ring gate 236, the amount of additional fluent material and the pressure thereof entering through secondary inlets 208 and 274, as well as longitudinal positioning of the ring gate 288. The provision of the ring gates 236, 288 are particularly important in precisely controlling fluid pressures so as to optimize the effects of each of the fluid treatment stages. The ring gate 236, 288 provide an easy external means of precisely controlling the flow (and thus the pressure) of the fluent materials so as to fine tune the apparatus. Thus, any dimensional or operational variations introduced into the assembly during manufacturing operations can be easily compensated for after the device is installed simply by adjusting either or both the ring gates 236, 288. The ring gates 236, 288, which effectively control the size of the flow restrictions respectively at the entrance and exit of the device, are preferably sized to compensate for the maximum pressure fall that is expected to be experienced through the housing 202. As the size of the entrance and exit restrictions are increased, less energy is consumed since a lesser load is imposed on the motor which rotates the impeller pump 280. It should be specifically noted here that although ring type gates 236, 288 are disclosed in connection with the preferred embodiment, various other valving structures could be employed to accomplish this same purpose, as those recognized in the art will readily appreciate. This valving structure could be integrated into the housing 202 of the device, or alternatively, could be integrated into the fluid supply lines connected with the inlet 204 and outlet 206. It should be noted here that the boots 234 and 310 possess an inclined shaped, relative to the path of flow so as to act as deflectors that avoid the creation of dead zones of stagnant fluid flow which would otherwise reduce the efficiency of the apparatus.

Figure 15:
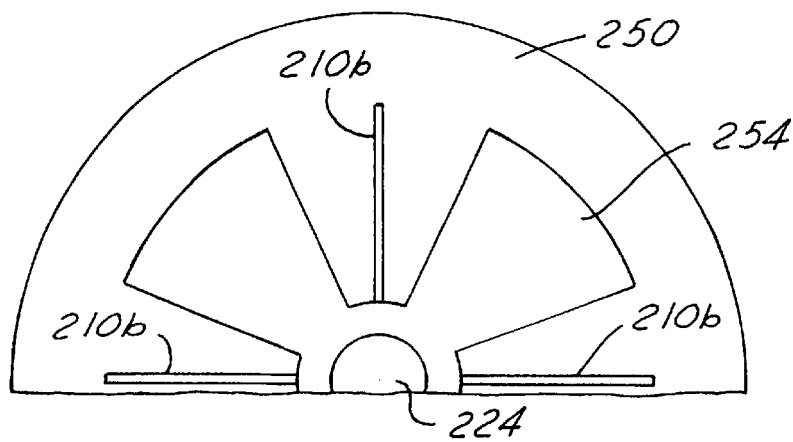
FIG. 15 is a fragmentary side view of a portion of one of the baffle plates, depicting cutting edges for cutting particles lodged between pairs of the baffle plates.
Figure 16:
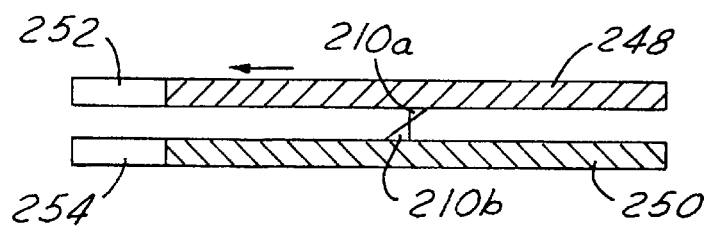
FIG. 16 is an enlarged, fragmentary, cross-sectional view of a pair of the baffle plates, showing the relationship of a pair of the cutting edges.

Reference is now also made to FIGS. 15 and 16 which depict a means for preventing particles or other materials from becoming lodged between the various rotating and stationary baffle plates of the embodiments shown in FIGS. 1 and 6. FIG. 15 is a fragmentary view of that face of the stationary baffle plate 250 which opposes the rotating baffle plate 248. As can be seen in FIG. 15, a plurality of circumferentially spaced, elongate cutting edges 210b extend radially on the face of the baffle plate 250, respectively between each of the openings 254. Similarly, there is provided a plurality of radially extending, circumferentially spaced cutting edges 210a on the face of the rotating baffle plate 248. As best seen in FIG. 16, the cutting edges 210a, 210b extend into the narrow spacing between plates 248, 250 and are configured to complementally form a scissors action-like cutting device which functions to cut and break up any particulates that may enter the narrow spacing between the plates. The cutting edges 210a, 210b are essentially radially coextensive so that the entire space between the pairs of rotating/stationary plates are protected from the potentially harmful effects of particulates which might otherwise become lodged therebetween, resulting in wear or malfunction. The cutting edges 210a, 210b may be formed integral with their associated baffle plates, or alternatively may be formed of a hardened material in strips that are attached to the baffle plates, as by welding. It is to be understood that each of the pairs of baffle plates employed in the embodiments of the invention shown in FIGS. 1 and 6 may be equipped with sets of cutting edges 210a, 210b, although they have not been specifically shown in FIGS. 1 and 6.

Figure 17:
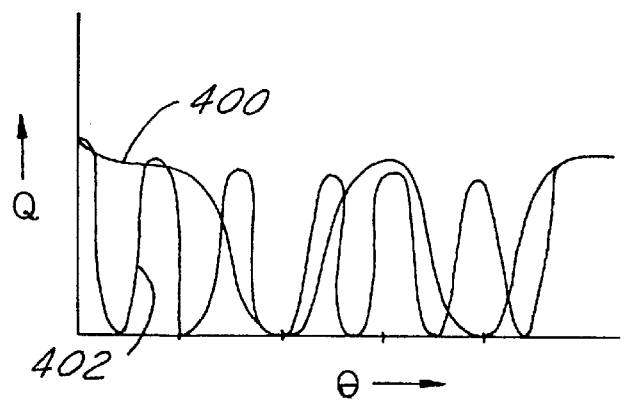
FIG. 17 is a graph depicting the rate of flow of fluent materials through the apparatus of FIGS. 1 and 6, as a function of time; and, FIG. 18 is a graph depicting the pressure as a function of time of flow of fluent materials through each treatment stage of the apparatus of FIG. 6.

FIG. 17 shows a pair of plots 400, 402 of the flow rates as a function of time for fluent material passing respectively through the first and second treatment stages of the apparatus 20. Specifically, plot 400 shows the flow rate through the baffle plates 248, 250 (first stage) while plot 402 shows the flow rate through plates 264, 266 (second stage) which has a frequency greater than that through the first stage. From FIG. 17 it can be seen that the flow rate oscillates in magnitude as a result of the pulsation action produced in the treatment stage. The oscillatory nature of the flow rate is not unlike an alternating electrical current, and it is this sharp change in flow rate as a function of time that results in energy being imparted to the fluent materials that causes molecular conditioning to facilitate mixing or other processing of the materials. The exact frequency selected for the various stages of the apparatus 200 depend upon the particular application and the nature of the fluent materials being treated. In some applications, a high frequency may be significantly more efficient in treating the materials for a particular purpose. Generally, each subsequent downstream stage of the apparatus 200 should have a pulse frequency which is the same as or greater in magnitude than the preceding stage. Although in some applications, the same pulse frequency may be used for two adjacent stages, it is generally preferred that the downstream stage possess a higher pulse frequency than the stage which precedes it in the flow path. The velocity of flow of fluent material through the apparatus 200 may also be an important factor in some applications. Flow velocity may be important since it determines the size of the "bubble" of fluent material passing through the various orifices in the baffle plates. Generally, maximum flow velocity is desired for most applications, but the desire for maximum flow velocity must be balanced with the amount of energy required for turning the shaft 224.

Figure 18:
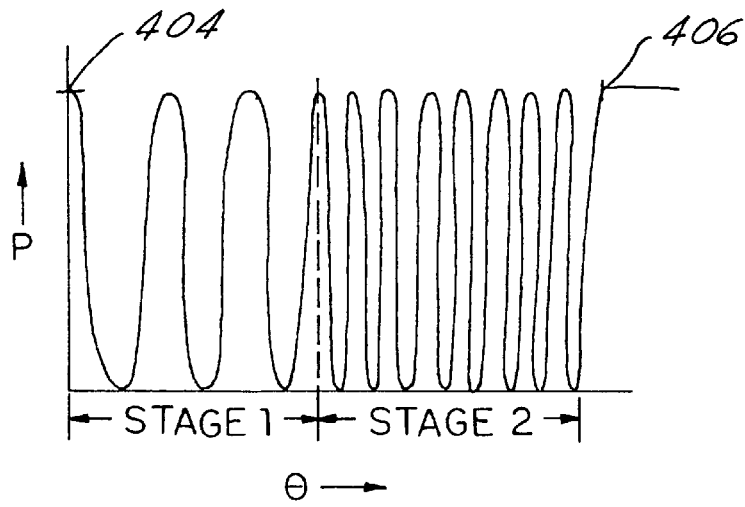

FIG. 18 is a graph of a plot of the pressure of the fluid flowing through the embodiment of the invention shown in FIG. 6, as a function of flow time. The initial fluid pressure, indicated at 404 is that of the initial input pressure to the device. It can be seen from FIG. 18 that the frequency of pressure oscillation produced by the first treatment stage is much less than that produced by the second stage. The pressure at point 406, which is equal to that of the initial, starting pressure, corresponds to the pressure of the fluid as it exits from the apparatus 200.

The apparatus and method of the present invention may be advantageously used in a variety of applications and operations. The apparatus can be employed to carry out either continuous or batch-wise processing. A number of the apparatuses of the present invention may be combined, either in serial or parallel connection with each other for the purpose of either handling larger amounts of fluent material or to satisfy more stringent processing requirements. The apparatus and method of the present invention can be employed for mixing compounds, dehydration of elements, coating of solids, increasing the specific surface area of solids and liquids, flash drying processes and mixing of dried solids for a variety of uses. Further examples where the invention may be successfully used are as follows: aeration of water; nebulization of water for irrigation and incorporation of nutrients or plaguicides pulverization or fluidization of carbon and ash; humidification; a wide range of organic and inorganic chemical reactions; to effect heat and/or mass transfer for cooling and refrigeration purposes; and a wide range of separation processes, such as lixiviation, crystalization, sublimation, gas diffusion and dialysis; liquid extraction; liquid/gas processing including dispersion, separation and contacting; liquid/solid processing systems, including mixing and agitating pastes, suspensions, gels, clarification films and ion exchange; gas/solid applications including reactions and mass and/or heat exchange, and other similar applications. One further significant use of the invention is in connection with the decontamination of gases and water. For example, the invention can be employed to remove solids or various grain sizes, hydrocarbons from gases as well as the removal of contaminating gases from other gases and use in oxidation of nitrogen oxide. In the area of water decontamination, the invention can be used for separation of particles, air separation, conditioning of dissolved organic matter, to add oxygen or incorporate additives, to promote coagulation, for demineralization, to destroy dissolved organic matter, and in the treatment of solid materials for the adsorption of metals.

Several examples of the use of the present invention and some of the fields and applications described immediately above will now be given.

EXAMPLE NO. 1

To demonstrate the effectiveness of the present invention for increasing the specific surface area in solids and increasing the contact intensity and energy, a prototype system was developed for capturing several compounds in a gas flow, in different processes, in order to demonstrate the efficiency of the process. This was accomplished by varying the conditions of feed to the apparatus as well as varying the conditions of operation and comparing the results to the efficiency of conventional processes. The first test involved attempting to recover particles from a fluent material, including those of less than 0.3 microns in size. The test was carried out in metallurgy plant in which the invention was employed to capture arsenic and lead oxides from effluent gases generated by a furnace, flowing at 1800 cubic meters per hour. These gases were produced from the processing of silver at a temperature of 250° C. Using conventional means for capturing arsenic and lead oxides, particles greater than 10 microns may be captured with efficiencies of between 85 and 90 percent, using bag filters; however, those particles of less than 10 microns pass through the filters and cannot be captured. The use of electrostatic precipitator type devices allow the capture of such particles down to 3 microns, with 95% efficiency, however, smaller particles could not be captured. The apparatus of the present invention was located upstream to the flow of these gases and water was sprayed onto the gases as they entered into the apparatus. Another test was carried out by adding water through a nozzle and connecting it in line with a separating cyclon in order to retain the liquors with the original particles of the fluid and those captured. The test results revealed the following. 4492 g/hr entered the apparatus and 0.021 g/hr exited, with an efficiency of 99.99%. 0.379 g/hr of arsenic was introduced and 0.005 g/hr exited with an efficiency of 98.68. 0.06 g/hr of antimony entered and was essentially completely removed since none could be detected at the outlet of the apparatus. 0.57 g/hr of iron entered and 0.07 g/hr exited, with an efficiency of 98.77%. These measurements were carried out using probes at the entrance and exit of the apparatus, using an isokinetic profil.

With respect to the granularity of the captured particles, it was noted that 3.97 g/hr of particles greater than 10 microns were measured at the inlet, whereas at the outlet there were no particles of such size so that 100 percent efficiency was obtained. With respect to particles between 3 and 10 microns, 14.11 g/hr were present at the inlet, but only 0.32 g/hr were present at the outlet, thereby giving a capture efficiency of 97.73%. Concerning particles of less than 3 microns, 0.188 g/hr were measured at the inlet versus 0.005 g/hr at the outlet, yielding a capture efficiency of 97.34%.

During this same test, sampling of $SO_2$ was carried out using a chromatography gas analyzer, with the following results: At the entrance of the apparatus, there were 1317.03 g/hr $SO_2$ and at the outlet, 0.42 g/hr, representing a capture efficiency of 99.97%

It is apparent that one advantage represented by the use of the present invention in these types of processes, in view of the efficiency thereof, is the reduced size of captured particles compared to conventional systems employing bag filters, cyclons and electrostatic precipitators. Further advantages are the compact size of the inventive apparatus, as well as the substantially lowered operation cost thereof, and the advantage of being able to use treated waste water in this process. In addition to being able to capture gases and powders simultaneously, as in the case of $SO_2$, it has an even greater advantage as a decontaminant system and a recoverer of materials.

In the process of the present invention, several phenomena take place, such as the expansion of the particles, the momentarily or instantaneous weakening of van der Waals forces between the molecules, whereby a synthesis of all of the involved elements is given, thus providing for the management of all of the elements in the liquid phase, including the occlusion of gases, greases and particles accompanying the gaseous flow of any grain size; this provides for a controlled manipulation of the gases and their companions so that they may be separated in a further step or subjected to further treatment or desired disposal. The invention can be used as decontaminant equipment to capture particles that are undesirable in the atmosphere, and also as a collector for particles of high value, such as in furnaces used to process copper, wherein gases of precious metals, such as palladium otherwise escape.

EXAMPLE NO. 2

Recovering of Hydrocarbons: Product of an Asphalt Stripping Distillation Process Gases were fed through the main entrance of the apparatus of the present invention, induced by an internal driver of 150 mm $H_2O$, with a flow of 1800 $m^3$/hr in actual conditions and by the positive pressure accompanying the gases of 60 mm $H_2O$, to a temperature of 120° C. These hydrocarbons included among others, hexane, benzene, formaldehyde, linoleic acid, acrolein, as well as particulate material and inorganic acids, such as sulfuric and phosphoric acids.

The following results were obtained:

| COMPOUND | INPUT | OUTPUT | YIELD |
| --- | --- | --- | --- |
| Arsenic | 397.700 | 0.06275 | 99.98 |
| Lead | 21.010 | 0.01283 | 99.94 |
| Cadmium | 5.250 | 0.00193 | 99.96 |
| Mercury | 52.500 | — | 100.00 |
| Selenium | 322.700 | — | 100.00 |
| Iron | 211.600 | 0.05752 | 99.97 |
| Particulated Material | 2400.000 | 6.1073 | 99.74 |
| Carbon Dioxide | 3960.000 | 500.72000 | 86.80 |
| Carbon Monoxide | 396.00 | 41.58000 | 89.50 |
| $SO_2$ | 85.700 | 20.4500 | 76.10 |
| $SO_3$ + $H_2OSO_4$ mist | 694.790 | 94.4000 | 85.60 |
| Nitrogen Oxides | 3.59000 | 0.1468 | 95.51 |
| Acrolein | 0.9121 | 0.00038 | 96.87 |
| Acetic acid | 0.9697 | 0.00162 | 99.83 |
| Methyl Alcohol | 0.8929 | 0.1053 | 98.82 |
| Myristic Acid | 0.9697 | 0.00162 | 99.86 |
| Palmitic Acid | 1.5350 | 0.04973 | 96.76 |
| Stearic Acid | 2.6183 | 0.01464 | 99.44 |
| Oleic Acid | 8.9400 | 0.02485 | 99.72 |
| Linoleic Acid | 1.8260 | 0.00843 | 99.54 |
| Methane | 1.6600 | 0.27370 | 99.98 |
| Acetylene | 4.7000 | 0.00966 | 99.97 |
| Ethane | 2.5000 | 0.01286 | 99.99 |
| Ethylene | 6.8000 | 0.00643 | 99.99 |
| Fenanthreno | 4.1200 | — | 100.00 |
| Anthracene | 0.0016 | — | 100.00 |
| Fluoranthene | 0.0008 | — | 100.00 |
| Pyrene | 3.7400 | — | 100.00 |
| Benz (A) Anthracene | 0.0017 | — | 100.00 |
| Benz (a) Pyrene | 2.0900 | — | 100.00 |
| Particulate Material | 2400.000 | 6.1073 | 99.74 |
| $SO_2$ | 85.7000 | 20.4500 | 76.10 |
| $SO_3$ + $H_2OSO_4$ mists | 694.7900 | 99.4000 | 85.60 |
| Nitrogen Oxides | 3.5900 | 0.1468 | 95.91 |

EXAMPLE NO. 3

Aeration of Waste Waters for the Aerobic Treatment Thereof

In order to eliminate organic matter from waste or process waters, it is necessary to add oxygen to the air, and this is commonly achieved by admixing water and air as a source or with compressed air from the bottom, by means of diffusers. However, in all these instances, the process is normally highly speculative and depends on the time of contact between the particles and on the diameter of the bubbles. Upon installing the apparatus of the present invention in the line feeding the stream of water to be treated, and with air added in the pre-mixing zone, intimate and whole contact was obtained between the air and water, in the same line, with high reliability of results.

EXAMPLE NO. 4

Elimination of Oxygen from Water for the Anaerobic Treatment and Protection of the Processing Equipment; Adsorption and Gases Reactions in Water Another test was carried out with the inventive apparatus to measure the efficiency of its capacity to retain and/or react gaseous streams for the treatment thereof, and to demonstrate that it can be used to reliably clean water to ecological regulation standards of purity and cleanliness. In order that the test be representative for several types of fuels, combustion gases were used from a boiler burning fuel oil with a content of 3.4% sulphur, 10.6% hydrogen, 85% carbon, 0.4% nitrogen, 0.6% ashes, 400 ppm vanadium, with a heat power of 9960 Kcal/kg and a gravity of 0.977 at 10° C., the thinking here being that if it is possible for us to clean up the gases of such a dirty fuel, it would be known that it would be assured that combustion gases from better fuels could also be cleaned. The operation conditions for the boiler, included combustible air an excess of 30%.

During the test, the gaseous stream enters via the main entrance of the inventive apparatus, through the suction of its own inductor. Through one of the nozzles of the premixing chamber, recirculation water was added so that, when passing through the apparatus, this is occluded by water which, with the presence of oxygen accompanying the gases by an excess of air, the oxidation and hydration thereof is promoted, in order to yield sulfuric acid, when high turbulent baffle plates are used, or sulfurous acid when intermediate turbulent baffle plates are used and/or the presence of oxygen is limited among other variables to be considered. Thereafter, the mixture passes to a separation process wherein the gases are liberated by a change of direction effect, whereby the liquor containing water, acids, grease and particles that originally accompanied the combustion gases, precipitate into a container for further treatment thereof to separate the grease, by flotation of the heavy solids, such as ash and metals, by decantation, and the acids are separated in the liquid carried into another container, wherein the same can be concentrated for the industrial use thereof, as is, or neutralized to form inert manageable salts, such as gypsum or calcium sulfite when neutralization is made with calcium or the crystalization of ammonium salts, when the neutralization is made with ammonia. These sales of the liquor are withdrawn in the form of precipitates and the clarified water is returned for feeding the premix chamber of the apparatus.

For this test, again the apparatus of the present invention was used, and sampling was performed by means of a probe of combustion gases from the forced draft blower normally carrying the combustion gases towards the chimney. The boiler used in the installation was associated with a turbo-generator rated at 16.5 MW, and was equipped with very old burners. In order to evaluate the characteristics of the application of the inventive apparatus, $SO_2$ and particles at the outlet of the boiler were measured, as well as prior to their entrance into the apparatus, against the measurements at the exit of the apparatus.

The apparatus, as shown by the test results, has a very significant application in the decontamination of various production processes related to the treatment of gases which are discharged into the atmosphere, the formation of acids, the preparation of emulsions and/or separation of grease and oils from a given stream in an aqueous medium; and, the separation of particles or a combination of all of these processes.

The results of the tests, expressed in parts per million parts of $SO_2$, were as follows:

| Sulphur (S) | |
|---|---|
| Fuel oil with 3.4% of S, generates | 4250 ppm |
| Taking as a reference a fuel oil with 1% S, which is a conventional case, there could be produced | 1250 ppm |
| Rules demand a maximum production equivalent to the burning of a fuel oil with 0.32% S, from a conventional case of 1% S | 400 ppm |
| As an average of the measurements made upon passing the gases through the inventive apparatus, of 4250 ppm, it was reduce to one equivalent to a fuel oil with 0.16% S | 195 ppm |
| Therefore, the efficiency was | 99.4% |

The preceding example establishes that the efficiency of the apparatus to achieve intimate contact as well as increase the surface of solids and liquids, and further increase in energy and, therefore, the degree of enthalpy inside the apparatus. This promotes oxidation reactions and the same treatment provides for an analysis at the exit thereof, signaling a quick and suitable separation for the final disposal.

EXAMPLE NO. 5

Room Humidification and Dehumidification in Order to Increase the Relative Humidity and Provoke Mass Movement Through Gas Diffusion at Different Temperatures The humidification and/or dehumidification of a room is controlled by the flow of heat and the vapor diffusion through the gas at the gas-liquid interface, since it is necessary in order to reflect the effectivity of the application of the inventive apparatus, in these processes, to take into account the change of temperature a liquid can be subjected to, thus creating a temperature gradient that originates a resistance of the liquid phase to the heat flow at the time of evaluation. This experiment, therefore, was carried out in an enclosed chamber, maintaining in every instance the same temperature conditions in an artificial manner, and working with distilled water, starting on the basis that there cannot be a resistance to the liquid phase diffusion, since there is no concentration gradient in a pure liquid. Upon maintaining the ambient variables constant, in order to simplify the experiment, it will be considered as an adiabatic system.

The experiment consisted in using, as a pattern, a booth wherein the relative humidity is averaged to temperature, pressure and closed-circuit recirculation to constant speeds, by using a sample of air equal to the pattern and the experiments. A volume of air of 15 $m^2$, temperature, pressure and water quality, were taken as a constant; and the variables were the water addition means and the volume of water to be added; the measurements were the time to reach the previously established desired comfort with the greatest yield of water, both for humidification and dehumidification. Two conventional systems of water addition into the comparing chamber were used, and in the first instance, a conical nozzle of about 0.25" to a pressure of 4 kg was used; and in a second instance, an ejection system with a positive displacement blower, with a flow of 900 $m^3$/hr and a pressure of 3 kg, having the ejector a venturi of 0.125". The apparatus was installed in a water feed line in a 4" connection to the main entrance for the air addition by forced draft, induced by the apparatus rotor itself, and introducing through a pre-conditioning chamber, a water stream by means of a 0.125" connection, and for the drop-sampling, a drain was installed at the last chamber, in order to verify whether there was a leakage or not as a measure of efficiency in nebulization inside the apparatus.

A direct measure of the humidification is in direct relationship to the diameter of the drops added thereto, which was the subject of another experimental measurement.

For illustrative effects, it is to be noted that the conditions were to increase the relative humidity conditions from 15% to 40%, at a temperature of 50° C. and a relative pressure of 0 atm, for which a 0.035 kg of steam is required to every kg of dry air, less the already contained humidity that was of 0.015 kg of vapor/kg of dried air. Taking into account a weight of air of 0.9987 kg/m$^2$, it is required 0.2996 kg of water vapor.

The time to reach the desired conditions, taking simultaneous measurements, were, in each instance: first, 14.2 min. Second, 8.84 min and with the supermixer, 3.45 min. Regarding rate, the following were measured: first, 3.5 kg, second, 1.97 kg and third 1.05 kg, and a greater efficiency in time of 75.7% regarding the first and 60.9% regarding the second.

EXAMPLE NO. 6

Liquid Pulverization

In the process of varnishing wood in a continuous manner as to form fine layers, the varnish is normally diluted and pistol-applied; however, the diameter of the drops is not fine enough to provide for fine and uniform thicknesses. Therefore, a test was developed in order to determine what the benefits might be of applying the inventive apparatus in this process.

A transport band was used to apply varnish to a wood surface, covering triplay sheet surfaces of 3.05 m×1.8 m in a continuous manner, in the form of a fog, with a variable speed, passing through a chamber, with a varnish diluted with essence of turpentine and pine oil to a ratio of 15:1, under constant temperature and pressure conditions. In both cases, a variable speed metering device is provided for the diluted varnish, with a flow meter in order to determine the comparative results obtained upon maintaining the same feed speed in the band and to measure the thickness, as well as to quantify the yield of two different devices. There was also measured the feed speed of the band to the same thickness, so as to measure the production efficiency. As a reference and comparative point, a conventional process was taken, consisting in a header with air guns and conventional nozzles for the application of enamels and varnishes, to apply, in a linear and perpendicular manner, varnish onto the sheet being fed by means of a transportation band with a variable speed. In this example, the inventive apparatus is used to feed air, through the main mouth, at a pressure of 1 kg/cm$^2$, with a rate of 300 m$^3$/hr, and the varnish feed is made independent from the turpentine feed and both of them are fed by gravity, maintaining the same ratio of 15:1, by means of nozzles, into the pre-mixing chamber and with a suction effect from the apparatus itself, and at the discharge, goes out through a nozzle with the width of a sheet. The test was made on a 25 sheet lot, with the following results:

Taking into account that a 3 micron thickness is a satisfactory result:

The main statistical consumption is of 2.7 kg of diluted varnish for the entire lot, when the conventional equipment is used, and employing a compressor pressure of 2 kg/cm$^2$, with an orifice of the acorn type with an unsoiled needle; an orifice every 0.25 m, used in 7 out of 10 instances in the market.

The consumption was of 2.89 kg varnish for the first instance and 2.05 kg varnish with the inventive apparatus. The standard variation in the thickness, in the conventional case, is of 0.91 microns, against 0.12 when the application is made with the apparatus, and the efficiency relating a variation in the production speed resulted 39% greater with the apparatus.

From the foregoing, it is apparent that the method and apparatus of the present invention described above not only provide for the reliable accomplishment of the objects of the invention but do so in a particularly reliable and simple manner. It is recognized, of course, that those skilled in the art may make various modifications or additions chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A method for processing fluent materials, comprising the steps of:

(A) introducing a flow of said fluent materials by differential pressure through a housing;

(B) imparting pulses of energy to said fluent materials by successively passing incremental quantities of said fluent materials in bursts from a relatively high pressure zone to a cavitation area within said housing; and varying the pressure of said fluent materials within said housing to achieve a desired pressure by adjusting a first restriction in said housing downstream from said cavitation area and by adjusting a second restriction in said housing upstream of said high pressure zone.

2. The method of claim 1, wherein step (B) is performed by periodically passing said incremental quantities of said fluent materials through openings in a baffle arrangement within said housing.

3. The method of claim 1, wherein step (B) is performed by:

restricting the flow of said fluent materials from said high pressure zone to said cavitation area; and periodically relieving the flow restriction of said fluent materials to allow passage of said incremental quantities of said fluent materials in said pulses.

4. The method of claim 3, wherein:

said flow restricting substep is performed by providing baffle means within said housing for opposing said flow, and said relieving substep is performed by periodically opening a portion of said baffle means.

5. The method of claim 4, wherein the opening of a portion of said baffle means is performed by relatively moving first and second sets of openings in said baffle means periodically between a first position preventing flow of said fluent materials therethrough, and a second position allowing flow of said fluent materials therethrough.

6. The method of claim 4, wherein the opening of a portion of said baffle means is performed by relatively rotating a pair of baffle plates respectively having first and second sets of openings therein such that said first and second sets of openings are alternatively shifted into and out of registration with each other.

7. The method of claim 6, wherein the relative rotation of said baffle plates is performed by maintaining one of said baffle plates stationary and rotating another of said baffle plates.

8. The method of claim 4, including the step of: (C) premixing said fluent materials within said housing before carrying out step (B).

9. The method of claim 8, wherein step (C) is performed by receiving said fluent materials respectively through separate inlets in said housing into a premixing zone within said housing.

10. The method of claim 1, wherein step (B) is performed at each of first and second treatment areas within said housing.

11. The method of claim 10, wherein the passing of fluent materials in bursts in step (B) is performed at one frequency at said first treatment area and another frequency at said second treatment area.

12. The method of claim 11, wherein step (B) is performed by:

baffling the flow of said fluent materials through said housing at said first and second treatment areas respectively using first and second pairs of baffle plates, and rotating one of the baffle plates relative to the other baffle plate in each of said first and second pairs thereof to periodically shift openings in each of said first and second pairs of baffle plates into registration with each other to allow said bursts of said fluent materials to flow therethrough.

13. The method of claim 1, wherein step (B) is performed by:

baffling the flow of said fluent materials through said housing using at least a first pair of baffle plates to produce said high pressure zone and said cavitation area, and periodically shifting openings in said baffle plates into registration with each other to allow said bursts of said fluent materials to flow therethrough.

14. The method of claim 13, wherein the shifting of said openings is performed by rotating one of said plates relative to the other.

15. The method of claim 14, wherein the shifting of said openings is performed by rotating one of said plates exposed to said high pressure zone and maintaining stationary the other of said plates exposed to said cavitation area.

16. The method of claim 1, including the step of:

(C) producing vibrations in said fluent materials before performing step (B) by flowing said fluent materials past an oscillating member within said housing and disposed in the flow path of said fluent materials.

17. The method of claim 1, wherein adjusting said second restriction is performed by sliding a flow control valve within a valve opening adjacent an outlet in said housing through which said fluent materials exit from said housing.

18. The method of claim 1, including the step of compensating for the drop in pressure of said fluent materials resulting from said cavitation area by subjecting said fluent materials to a pump within said housing downstream of said cavitation area.

19. A method for processing fluent materials, comprising the steps of:

introducing a flow of said fluent materials by differential pressure through a housing;

imparting pulses of energy to said fluent materials by successively passing incremental quantities of said fluent materials in bursts from a relatively high pressure zone to a cavitation area within said housing, resulting in a pressure drop; and compensating for said pressure drop by controlling the flow of said fluent materials with a displaceable flow control means downstream of said cavitation area.

20. A method for processing fluent materials, comprising the steps of:

introducing a flow of said fluent materials by differential pressure through a housing;

imparting pulses of energy to said fluent materials by successively passing incremental quantities of said fluent materials in bursts from a relatively high pressure zone to a cavitation area within said housing resulting in a pressure drop; and compensating for said pressure drop by controlling the flow of said fluent materials with a displaceable flow control means upstream of said cavitation area.

* * * * *